United States Patent
Andrzejak et al.

(10) Patent No.: US 10,370,829 B2
(45) Date of Patent: Aug. 6, 2019

(54) ARTICLES COMPRISING A SURFACE SPREADING AGENT, OILFIELD WATER STORAGE SYSTEMS EMPLOYING THE SAME, AND METHODS OF MANAGING THE OILFIELD WATER STORAGE SYSTEMS

(71) Applicants: Timothy Al Andrzejak, Sugar Land, TX (US); Jorge E Lopez De Cardenas, Sugar Land, TX (US); Daniel B O'Brien, Brentwood Bay (CA)

(72) Inventors: Timothy Al Andrzejak, Sugar Land, TX (US); Jorge E Lopez De Cardenas, Sugar Land, TX (US); Daniel B O'Brien, Brentwood Bay (CA)

(*) Notice: Subject to any disclaimer, the term of this patent is extended or adjusted under 35 U.S.C. 154(b) by 0 days.

(21) Appl. No.: 15/344,709

(22) Filed: Nov. 7, 2016

(65) Prior Publication Data
US 2017/0130075 A1    May 11, 2017

Related U.S. Application Data

(60) Provisional application No. 62/251,641, filed on Nov. 5, 2015.

(51) Int. Cl.
C02F 7/00 (2006.01)
E02B 1/00 (2006.01)
(Continued)

(52) U.S. Cl.
CPC ............... *E03B 1/02* (2013.01); *E21B 21/01* (2013.01)

(58) Field of Classification Search
CPC ... C02F 7/00; B65G 5/00; F17C 1/007; F17C 3/005; E02B 1/003; E02B 3/10
(Continued)

(56) References Cited

U.S. PATENT DOCUMENTS 2,878,098 A * 3/1959 Treloar .................... E02B 3/00
137/78.5
3,209,977 A * 10/1965 Lewis ................... D06F 95/006
220/DIG. 30
(Continued)

FOREIGN PATENT DOCUMENTS

WO    2008/014566    2/2008

OTHER PUBLICATIONS

Basin Planning and Management Organisation; Evaporation Control in Reservoirs, 2006, Link: http://cwc.gov.in/main/downloads/Evaporation%20Control%20in%20reservoirs.pdf.*
(Continued)

*Primary Examiner* — Benjamin F Fiorello
*Assistant Examiner* — Edwin J Toledo-Duran

(57) ABSTRACT

Articles including a surface spreading agent, oilfield water storage systems that employ the articles, and methods of managing an oilfield water storage system are provided herein. In an embodiment, an article includes a film-forming composition and a densifying agent. The film-forming composition includes a surface spreading agent present in an amount of at least 5 weight %, based on the total weight of the film-forming composition. The densifying agent has a higher density than water and the surface spreading agent. The film-forming composition is packaged in an impervious material.

13 Claims, 2 Drawing Sheets

(51) Int. Cl.
   *B65G 5/00*    (2006.01)
   *E02B 3/10*    (2006.01)
   *E03B 1/02*    (2006.01)
   *E21B 21/01*   (2006.01)

(58) Field of Classification Search
   USPC ........... 405/22, 52; 422/43, 42, 256, 259;
       427/345; 210/170; 232/194; 424/400,
       424/489; 118/52, 56, 319, 402; 509/162;
       252/383, 384; 588/249
   See application file for complete search history.

(56) References Cited

U.S. PATENT DOCUMENTS

| | | | | |
|---|---|---|---|---|
| 3,425,791 A * | 2/1969 | Koberg | ................... | B01J 19/16 222/54 |
| 3,528,764 A * | 9/1970 | Reiser | ..................... | B01J 19/16 422/43 |
| 3,760,947 A * | 9/1973 | Morrison | ................ | C02F 1/763 210/167.11 |
| 3,902,202 A * | 9/1975 | Strange, Jr. | ............... | E04H 4/12 4/504 |
| 4,297,973 A * | 11/1981 | Knowles | ................ | A01K 61/80 119/225 |
| 4,455,226 A * | 6/1984 | Lahav | .................... | F24S 10/13 210/170.09 |
| 5,231,523 A * | 7/1993 | Nakaya | .............. | C09K 19/2021 349/123 |
| 5,549,848 A * | 8/1996 | Zeheb | ...................... | B01J 19/16 252/194 |
| 5,558,228 A * | 9/1996 | Jackisch | ................ | A01N 25/34 206/205 |
| 5,558,845 A * | 9/1996 | Pauken | .................. | E03B 11/00 422/256 |
| 5,827,586 A * | 10/1998 | Yamashita | ............. | B32B 27/08 428/36.6 |
| 6,303,133 B1 | 10/2001 | O'Brien | | |
| 6,558,705 B2 * | 5/2003 | O'Brien | ................... | B01J 19/16 252/194 |
| 8,696,987 B2 * | 4/2014 | Solomon | .................. | B01J 19/16 422/43 |
| 2001/0022355 A1 * | 9/2001 | O'Brien | ................... | B01J 19/16 252/194 |
| 2002/0182348 A1 * | 12/2002 | Fujiwara | .................. | B29D 7/01 428/35.2 |
| 2002/0192028 A1 * | 12/2002 | Carston | ................. | E04H 4/0037 405/53 |
| 2003/0020043 A1 * | 1/2003 | Barresi | ................... | A01N 25/08 252/194 |
| 2004/0115378 A1 * | 6/2004 | Dunaway | ............... | C09K 8/536 428/35.4 |
| 2007/0068160 A1 * | 3/2007 | Jagusztyn | ................. | F03G 7/04 60/641.6 |
| 2009/0114392 A1 * | 5/2009 | Tolman | ................... | E21B 43/25 166/305.1 |
| 2009/0166171 A1 * | 7/2009 | Smith | ...................... | B01D 1/16 203/12 |
| 2009/0234025 A1 * | 9/2009 | Strachan | ................ | A01N 25/30 514/772.3 |
| 2012/0018387 A1 * | 1/2012 | Solomon | .................. | B01J 19/16 210/749 |
| 2012/0097889 A1 * | 4/2012 | Kellar | ....................... | C02F 3/34 252/181 |
| 2016/0289105 A1 | 10/2016 | Andrzejak | | |

OTHER PUBLICATIONS

Santa Cruz Biotechnology; "Hexadecanol"; 2010; Link: http://datasheets.scbt.com/sc-237566.pdf.*
W.J. Roberts, "Reducing Lake Evaporation in the Midwest," Journal of Geophysical Research, 1959, pp. 1605-1610, vol. 64 No. 10, State of Illinois.
P.A. Coop, "Detection of Evaporation Reducing Monolayers on Open Water Surfaces," University of New England, 2011.
W.R. Barger et al., "Modification of the Air/Sea Interface by Artificial Sea Slicks," NRL Report 6762, 1968.
M. Hightower et al., "Evaporation Suppression Research and Applications for Water Management" Identifying Technologies to Improve Regional Water Stewardship: North-Middle Rio Grande Corridor, 2004.
J.M. Walsh "Water Management for Hydraulic Fracturing in Unconventional Resources—Part 5: Methods of Controlling Biological Activity", Oil and Gas Facilities, 2014.
S. Bottero et. al., "Formation Damage and Impact on Gas Flow Caused by Biofilms Growing Within Proppant Packing Used in Hydraulic Fracturing", SPE 128066, 2010.
M. Wentzel et al., "Evaluation of Evaporation Suppression Tests on Lake Arrowhead, Texas", TWDB Analysis Paper 15-1, 2015.

* cited by examiner

ARTICLES COMPRISING A SURFACE SPREADING AGENT, OILFIELD WATER STORAGE SYSTEMS EMPLOYING THE SAME, AND METHODS OF MANAGING THE OILFIELD WATER STORAGE SYSTEMS

CROSS-REFERENCE TO RELATED APPLICATIONS

This application claims the benefit of U.S. Provisional Application No. 62/251,641, filed Nov. 5, 2015.

TECHNICAL FIELD

The technical field generally relates to articles including a surface spreading agent, oilfield water storage systems that employ the articles, and methods of managing the oilfield water storage systems. More particularly, the technical field relates to articles that include the surface spreading agent for selective release in open-air storage ponds used at oilfield sites, oilfield water storage systems including the open-air storage ponds, and methods of managing the open-air storage ponds.

BACKGROUND

Oilfield sites regularly employ the use of open-air ponds for storage of water to be used during certain oilfield extraction operations, such as well drilling, well stimulation, water injection, and hydraulic fracturing. Hydraulic fracturing generally involves pumping a fluid into a well at high pressures to create hydraulic fractures in an oil/gas reservoir into which the well is drilled. The fluid used in hydraulic fracturing is generally a mixture of water (~90%), a granular proppant material (~9.5%), and gellants and other common chemicals (~0.5%). The fluid is pumped into a reservoir at high pressures to create hydraulic fractures. The granular proppant material is deposited within the fractures to hold them open, leaving a high porosity flow path for petroleum extraction.

The fluid employed in hydraulic fracturing and the other oilfield extraction operations is subject to various unique management concerns, including biological species content, water loss due to evaporation or other. While use of water storage tanks may alternatively be utilized to isolate the water from the ambient environment, some bacterial species are able to thrive in anaerobic environments. Some of the bacteria that thrive in anaerobic environments generate hydrogen sulfide ($H_2S$), which is undesirable in oilfield applications for various reasons as known in the art. Within the storage tanks, the generated $H_2S$ (which is in gaseous form under ambient temperatures and pressures) may become trapped. Thus, open-air storage ponds, which are also more cost effective than storage tanks, are generally desired as the source of water for the oilfield operations.

Surface spreading agents are known for use in municipal water reservoirs, swimming pools, and agricultural water storage ponds for purposes of trapping heat and/or minimizing evaporation of water. However, municipal water reservoirs, swimming pools, and agricultural water storage ponds are not subject to the same considerations as open-air ponds used at oilfield sites. Unlike municipal water reservoirs, swimming pools, or agricultural water storage ponds, the water held in the open-air ponds used at oilfield sites is to be pumped into a well and contamination of the well and the hydrocarbon reservoir is a concern. As such, swimming pool and agricultural holding pond solutions are not necessarily appropriate for open-air ponds used at oilfield sites. Further, the oilfield sites where the open-air ponds are located are often much more isolated than municipal water reservoirs, swimming pools, or agricultural water storage ponds, rendering material delivery and handling much more difficult for the open-air ponds used at oilfield sites. Further still, handling of chemicals at oilfield sites frequently leads to negative perceptions, especially when oilfield employees are required to wear protective gear when handling materials employed at the oilfield water storage sites. Such negative perceptions are a concern because they have been known to significantly affect, or even imped, the oilfield operations at a particular location.

Accordingly, it is desirable to provide oilfield water storage systems that employ open-air ponds and methods of managing the same that enable effective delivery of a surface spreading agent to an open-air water storage pond, especially for such ponds that are used at oilfield sites. Further, it is desirable to provide surface spreading articles that avoid the need for users to employ protective gear when handling the articles. Furthermore, it is desirable to have a surface spreading agent on the surface of the water that reduces water evaporation and potentially reduces degradation and/or evaporation of biocides or other chemicals that may be applied to the water for preventing contamination of the well and the reservoir when the water is injected. Other desirable features and characteristics will become apparent from the subsequent detailed description and the appended claims, taken in conjunction with the accompanying drawings and this background.

BRIEF SUMMARY

Articles including a surface spreading agent, oilfield water storage systems that employ the articles, and methods of managing the oilfield water storage system are provided herein. In an embodiment, an article includes a film-forming composition and a densifying agent. The film-forming composition includes a surface spreading agent present in an amount of at least 5 weight %, based on the total weight of the film-forming composition. The densifying agent has a higher density than water and the surface spreading agent. The film-forming composition is packaged in an impervious material.

In another embodiment, an oilfield water storage system includes a water storage pond, a unit adapted to receive an article that includes a film-forming composition packaged in an impervious material, and a water outlet pipe in fluid communication with the water storage pond below the surface of the water storage pond. The unit is further adapted to distribute the film-forming composition into the water storage pond.

In another embodiment, a method of managing an oilfield water storage system includes applying a film-forming composition to a water storage pond of the oilfield water storage system. The film-forming composition is applied from an article that includes the film-forming composition packaged in an impervious material.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the oilfield water storage systems and methods of managing the same as described herein. Furthermore, there is no intention to be bound by any theory presented in the preceding background or the following detailed description.

Articles including a surface spreading agent, oilfield water storage systems that employ the articles, and methods of managing the oilfield water storage system are provided herein for enabling effective delivery of a surface spreading agent to an open-air water storage pond. The articles more specifically include a film-forming composition that includes the surface spreading agent, among other components, with the film-forming composition packaged in an impervious material. The impervious material enables direct contact to be avoided between users and the film-forming composition. Thus, the articles provide for delivery and handling of the film-forming composition while avoiding the need for users to employ protective gear when handling the articles.

Figure 1:
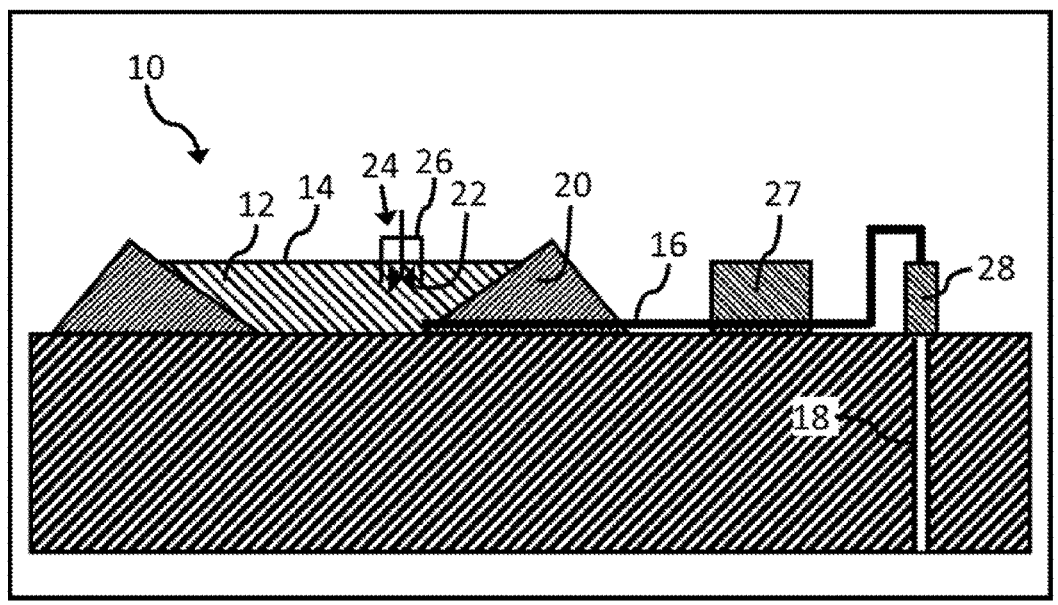
FIG. 1 is a schematic diagram of an oilfield water storage system in accordance with an embodiment.
Figure 2:
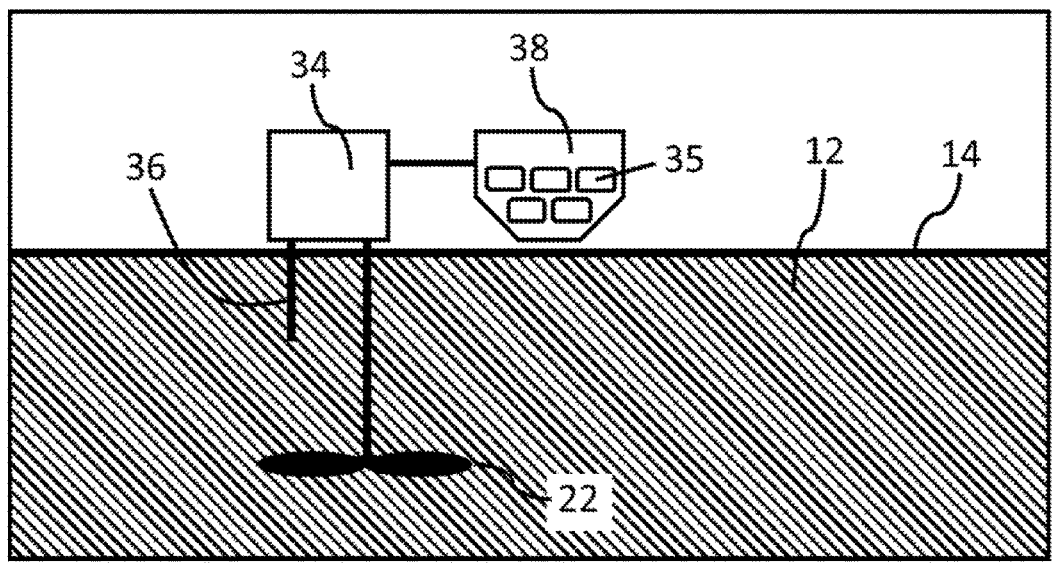
FIG. 2 is a schematic diagram illustrating a controller and a dispersing module for the management of a surface spreading agent in accordance with an embodiment.

Referring to FIGS. 1 and 2, in embodiments the oilfield water storage systems 10 include a water storage pond 12, a unit 38 adapted to receive an article 35 including a film-forming composition, and a water outlet pipe 16 in fluid communication with the water storage pond 12 below the surface spreading layer 14. The water outlet pipe 16 is also in fluid communication with an oil or gas well 18 to provide water that is ultimately included in fluid used in hydraulic fracturing or other oilfield extraction operations such as well stimulation or water injection. In embodiments, the water storage pond 12 is an open-air pond. As referred to herein, an "open-air" pond is a body of water that is retained in a holding area (which can be earthen, concrete, lined with plastic or clay, or the like) with an upper surface of the body of water open to the ambient environment. In embodiments and as shown in FIG. 1, the water storage pond 12 is raised above the ground with earthen berms 20. In other embodiments and although not shown, large portable tanks are set up akin to giant above-ground pools. In embodiments, the water contained within the water storage pond 12 may be freshwater, produced water, brines, or recycled wastewater. "Produced water" refers to water that is produced from a given well or wells, along with hydrocarbons, that has been subsequently separated. The fluid that is used in the hydraulic fracturing or other oilfield extraction operations and that includes the water from the open-air pond is not particularly limited and can be any fluid that is conventionally employed in oilfield extraction operations. In embodiments, the fluid includes a mixture of water, a granular proppant material, and gellants and other common chemicals.

Without being bound by theory, it is believed that the oilfield water storage systems 10 and methods of managing the oilfield storage systems 10, as described herein, minimize biological species growth by employing the surface spreading agent in the water storage pond. The surface spreading agent forms the surface spreading layer 14 as a film on a surface of the water storage pond 12, with the surface spreading layer 14 being as thin as a single molecule (i.e., a monomolecular layer) in some instances. Without being bound by any particular theory, it is believed that the surface spreading layer 14 on the surface of the water storage pond 12 may reduce biocide vaporization loss and/or degradation, leading to more effective bacterial and algae control. Further, the surface spreading layer 14 could influence a transfer function related to oxygen dissolution into the water and, thus, is an effective barrier to inhibit dissolution of oxygen from ambient air into the water storage pond 12. As a result, the growth of certain biological species (e.g., aerobic bacterial species, algae, and other biological species that depend upon oxygen to thrive) within the water is inhibited. Furthermore, since the single-molecule thick layer permits a large proportion of sunlight to pass-through, natural solar disinfection of the water is not impeded. Solar disinfection refers to the elimination of bacteria by ultraviolet radiation generated by the sun. Further still, because the water storage pond 12 may be naturally vented due to ambient air currents and agitation, it is believed that any unwanted gas generated by microbes within the water storage pond 12, such as $H_2S$ gas generated by anaerobic microbes, will also be maintained at or below an acceptable level. However, it is to be appreciated that in embodiments and as shown in FIG. 1, a mechanical agitator 22 (i.e., an engineered mechanism adapted to agitate the surface of the water) may be employed to assist with venting of the water storage pond 12. Suitable mechanical agitators 22 include, but are not limited to, those chosen from a water jet, a propeller, or a screw.

In embodiments and referring to FIG. 1, an at least semi-enclosed barrier area 24 is provided using a barrier 26, with the mechanical agitator 22 positioned therein to enable specific designated areas of the water storage pond 12 to be subject to mechanical agitation. By "at least semi-enclosed", it is meant that the barrier 26 may completely or partially enclose an area on the surface of the water storage pond 12, with the barrier 26 only partially extending down into the water storage pond 12. In this regard, the at least semi-enclosed barrier area 24 may optionally be employed to minimize disturbance of the surface spreading layer 14 on the surface of the water storage pond 12, thereby minimizing unwanted introduction of oxygen into the water storage pond 12 and leaving the surface spreading layer 14 intact over most of the surface of the water storage pond 12 while still effectively venting the water storage pond 12 to minimize build-up of unwanted $H_2S$ within the water storage pond 12.

In embodiments and referring again to FIG. 1, the oilfield water storage system further includes additional conventional components associated with oil or gas well and reservoir usage. For example, a hydraulic fracturing pump 27 may be employed to pressurize water from the water outlet pipe 16, with the pressurized water delivered to a well head 28 and down into the well 18 for purposes of effectuating hydraulic fracturing or other oilfield extraction operations.

The surface spreading agent, as described herein, refers to any combination of compounds that are applied to the water storage pond 12 and that are each capable of forming the surface spreading layer 14 as a film on the surface of the water storage pond 12. In embodiments, the surface spreading agent is delivered in a film-forming composition 13 that may include additional components beyond the surface spreading agent. In other embodiments, the surface spreading agent may be applied directly to the open-air pond in the absence of additional components present with the surface spreading agent.

Figure 3:
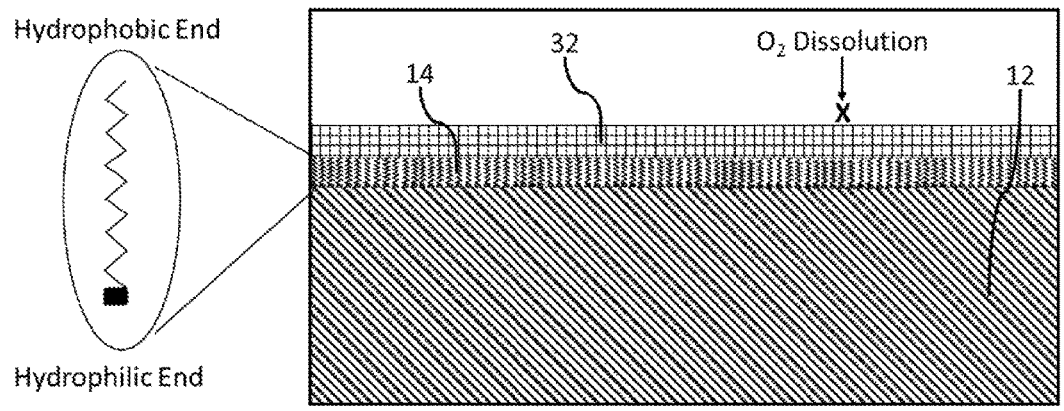
FIG. 3 is a schematic diagram illustrating an open-air pond of an oilfield water storage system with the open-air pond having a surface spreading layer formed thereon in accordance with another embodiment.
Figure 4:
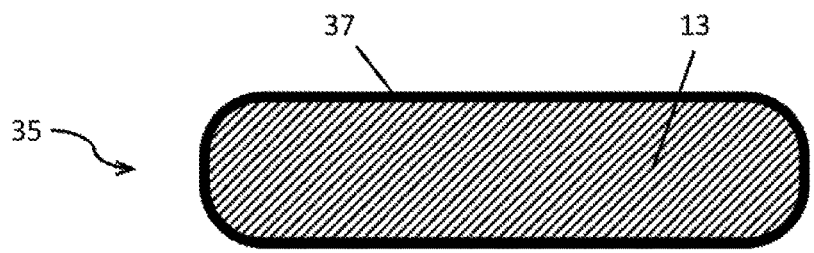
FIG. 4 is a schematic diagram illustrating an article including a film-forming composition packaged with an impervious material.
Figure 5:
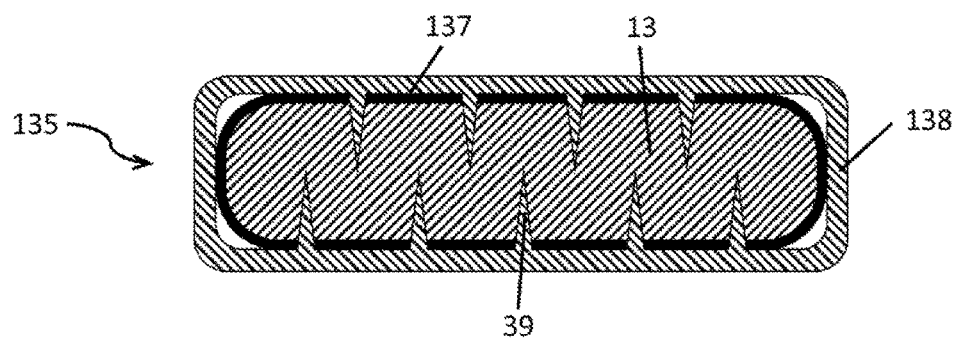
FIG. 5 is a schematic diagram illustrate a unit with an article disposed therein, wherein the unit adapted to puncture the impervious material of the article.

The surface spreading agent can include any compound that exhibits some inhibition of oxygen dissolution in the water storage pond 12 and that is capable of forming a film on the surface of the water storage pond 12. In this regard, the surface spreading agent has a lower density than water, which enables the surface spreading agent to form a surface layer or film. In embodiments, suitable surface spreading agents include those that are capable of generating a monomolecular layer as schematically illustrated in FIG. 3. Examples of suitable surface spreading agents include, but are not limited to, surfactants with optionally unsaturated straight chain molecules that have a hydrophilic portion and a hydrophobic portion. Other suitable surface spreading agents include those that are not generally considered surfactants but that nonetheless exhibit phase separation with water and that are capable of forming the film on the surface of the water storage pond 12. Specific examples of suitable surface spreading agents include, but are not limited to, aliphatic alcohols that contain between 12 and 24 carbon atoms (e.g., 1-dodecanol [$C_{12}H_{26}O$], 1-hexadecanol [$C_{16}H_{34}O$], stearyl alcohol [$C_{18}H_{38}O$], oleyl alcohol [$C_{18}H_{36}O$], and sorbitan monooleate [$C_{24}H_{44}O_6$]); polydiorganosiloxanes; polyoxyethylene ether; or a combination thereof.

In embodiments and as alluded to above, the surface spreading agent may be employed in a film-forming composition that includes the surface spreading agent and one or more other components other than the surface spreading agent that provide further functions. For example, in embodiments, additional components may be present to provide additional functionality, such as to assist with delivery of the surface spreading agent in water. In embodiments, the surface spreading agent is present in the film-forming composition in an amount of at least 5 weight %, such as from about 5 to about 20 weight %, based on the total weight of the film-forming composition. In one embodiment, the surface spreading agent (especially the aliphatic alcohols) is delivered in solid form and may be combined with a dissolution agent to assist with dispersal of the surface spreading agent in the water storage pond 12. Suitable dissolution agents include, but are not limited to, a salt such as calcium hydroxide, hydrated lime, or the like. In embodiments, the dissolution agent is present in an amount of at least 40 weight %, such as from about 40 to about 95 weight %, or such as from about 80 to about 95 weight %, based on the total weight of the film-forming composition. In addition to or as an alternative to the dissolution agent, the surface spreading agent may be combined with a densifying agent to assist with sub-surface dispersal of the surface spreading agent in the water storage pond 12. The densifying agent has a density that is greater than that of water and that is also greater than that of the surface spreading agent. Examples of suitable densifying agents include, but are not limited to, silica sand, slag sand, pea gravel, metal powders such as iron powder, barite powder, or combinations thereof. In embodiments, the densifying agent is present in the film-forming composition in an amount sufficient to provide the film-forming composition with a density greater than that of water, thereby enabling the sub-surface delivery of the surface spreading agent. For example, in embodiments, the densifying agent is present in an amount of from about 1 to about 50 weight %, such as from about 10 to about 50 weight %, or such as from about 25 to about 50 weight %, based on the total weight of the film-forming composition. In embodiments, the film-forming composition includes a sufficient amount of the densifying agent to render the film-forming composition denser than water, with a balance of the film-forming composition including the dissolution agent and the surface spreading agent. In embodiments in which the surface spreading agent is delivered in solid form, the film-forming composition is substantially free of liquid components, such as solvents. It is to be appreciated that the resulting surface spreading layer 14 may include at least some of the additional components in amounts detectable using conventional diagnostic equipment, even when such components (such as the dissolution agent and densifying agent) are only intended to deliver the surface spreading agent and dissolve into the water or fall to the bottom of the water storage pond 12.

The resulting film-forming composition that includes the surface spreading agent and the additional component(s) may be provided in various forms, such as powdered form, granule form, or tablet form. Powder form, as referred to herein, means a form with D50 particle size of less than about 0.1 mm. Granule form, as referred to herein, means a form with D50 particle size of from about 0.1 mm to about 5 mm. Tablet form, as referred to herein, means a form with a D50 particle size of greater than about 5 mm. In embodiments, the tablets have a minimum dimension through a volume of the tablet of at least 1 cm, such as from about 1 cm to about 50 cm.

The form of the film-forming composition may affect the manner in which the film-forming composition is delivered. For example, when delivered in powder form, the powder may rapidly dissolve in water to release the surface spreading agent. In this embodiment, the powder may be free of the densifying agent. However, when applied to the surface of the water, under certain conditions (e.g. high wind), the powder may migrate to the edge of the water storage pond 12 before it is fully incorporated into the water. Wave action of the water can then deposit the powder along the shoreline. Thus, as an alternative to the powder form, the film-forming composition may be applied in the granule or tablet form, with the film-forming composition including the densifying agent in an amount sufficient to render the film-forming composition denser than water. With the film-forming composition denser than water, the film-forming composition sinks below the surface of the water upon delivery into the water storage pond 12. After the film-forming composition sinks into the water, the film-forming composition rapidly dissolves and releases at least a portion of the surface spreading agent from beneath the water surface, thereby enabling dispersal of the surface spreading agent and minimizing migration of the surface spreading agent under wind or wave action prior to dissolution.

In other embodiments, the surface spreading agent may be delivered in solution and, thus, the film-forming composition may include one or more solvents that are used to dissolve the surface spreading agent(s) into solution. In this embodiment, the film-forming composition may be free of the dispersing agent and densifying agent, as described above. Examples of suitable solvents include, but are not limited to, polyethylene glycol, tetrahydrofuran or tetrahydrofurfuryl alcohol, and water-soluble saccharides. Film-forming compositions that include polydiorganosiloxane as the surface spreading agent may include canola oil, and canola oil may also be employed to dissolve or mix polyoxyethylene ether into solution. Additionally, alkanes (such as octadecane) may also be employed as solvents.

As additional functional components that may be present in the film-forming composition independent of whether the film-forming composition is in liquid or solid form, a conventional biocide and/or algaecide may be present to further inhibit propagation of biological species in the open-air pond.

In another embodiment, a surface protectant agent having a specific gravity lower than that of the surface spreading agent is incorporated into the film-forming composition or added to the water storage pond 12 separate from the film-forming composition. With the surface protectant agent having a lower specific gravity than the surface spreading agent, it is believed that the surface protectant agent will form a surface protectant layer 32 over the surface spreading layer 14 with the surface protectant layer 32 and the surface spreading layer 14 forming a stratified layer configuration on the surface of the water storage pond 12 as shown in FIG. 3. In this regard, the surface protectant layer 32 may further impede mass transfer mechanisms occurring at the interface between the water storage pond 12 and the atmosphere. In embodiments, suitable surface protectant agents include alkanes containing from 10 to 24 carbon atoms.

In embodiments, the film-forming composition is formulated with both the densifying agent and the surface protectant agent, and the film forming composition having both a liquid phase and a solid phase. In this embodiment, the densifying agent may assist with sub-surface delivery of the surface spreading agent while the surface protectant agent remains at or near the surface of the water during delivery. As such, this delivery mechanism may promote formation of the stratified layer configuration.

Due to the form that the film-forming composition 13 is in, it may ordinarily be appropriate for service personnel to take precautions owing to health and safety concerns when handling the film-forming composition 13. For example, in some instances when handling powdered materials, personnel may wish to wear a respirator to prevent dust inhalation. In other instances, chemical and/or solvent-resistant gloves may be worn when handling certain powdered chemical and/or solvent/liquid-based systems. Powdered calcium hydroxide (i.e., lime), in particular, may prompt personnel to wear rubber gloves and a respirator to limit skin irritation and powder inhalation, respectively.

While the surface spreading agent or film-forming composition 13 may be handled in powdered form, when the handling of chemicals requires personnel to wear different forms of personal protective equipment (a.k.a. PPE), negative perceptions regarding chemicals being handled can arise. Thus, in embodiments and as shown in FIG. 4, the film-forming compositions 13 are packaged in an impervious material 37 to form an article 35. The impervious material 37 provides a protective layer between the film-forming composition 13 and the individual handling the film-forming composition 13. By "impervious material," it is meant material that effectively packages and contains the film-forming composition 13 under typical storage conditions (e.g., ambient temperatures, humidity, etc.) without disintegrating or otherwise allowing significant loss of the film-forming composition 13. Furthermore, packaging the film-forming composition 13 in the impervious material 37 enables measured packaging of the film-forming composition 13 so that a pre-determined amount of the film-forming composition 13 can be expediently delivered to the water storage pond 12 in a controlled manner. In this regard, an optimal amount of the film-forming composition 13 can be delivered to effectively minimize evaporation without oversupplying (and thus wasting) the film-forming composition 13. Further still, the impervious material may provide UV protection to the film-forming composition 13 and minimize UV degradation of UV-sensitive compounds (such as certain biocides or other suitable chemicals) that may be present in the film-forming composition 13.

The impervious material 37 may be selected such that the impervious material 37 is water soluble. By "water soluble," it is meant that the impervious material 37 dissolves at a measurable rate in water. In embodiments, the impervious material 37 has a water solubility of at least 1 g/l, such as at least 5 g/l, at a temperature of about 21° C. As an example, the impervious material 13 can be a polyvinyl alcohol-containing composition such as those supplied under the tradename Hi-Selon™ produced by Nippon Gohsei. The article 35 including the impervious material that packages the film-forming composition can be introduced into the water storage pond 12 whereby the impervious material 37 subsequently dissolves to release the film-forming composition 13 into the water storage pond 12.

In another embodiment, the impervious material 137 is insoluble in water. Under this scenario, the impervious material 137 may be physically opened to release the film-forming composition 13 into the water storage pond 12. In embodiments, the impervious material that is insoluble in water includes those chosen from polyvinyl chloride, polyethylene, polypropylene, polyester, or a combination thereof. Physical opening of the impervious material 137 may be accomplished by the user cutting, ripping, puncturing, or rupturing the packaging material, followed by introducing the film-forming composition 13 into the water storage pond 12. Alternatively, a system may be employed such as that shown in FIG. 5, wherein the system includes a unit 38 that is adapted to receive the article 135 that includes the film-forming composition 13. The unit 38 is further adapted to distribute the film-forming composition 13 into the water storage pond 12. In embodiments, the unit 38 is further adapted to float on a surface of the water storage pond 12.

Referring to FIG. 5, in embodiments, the unit 138 includes a crushing surface 39 adapted to contact the article 135 in the unit 138. In embodiments, the crushing surface 39 is movable relative to the article 135 for rupturing the article 135. In embodiments and as shown in FIG. 5, the crushing surface 39 may include projections for puncturing the impervious material 137. The unit 138 including the crushed article 137 may be directly introduced into the water storage pond 12. In this regard, the unit 138 may be designed to float on the surface of the water, allowing it to be retrieved for reuse. Alternatively, the film-forming composition 13 may otherwise be released from the unit 138 without immersing the unit in the water storage pond 12.

Referring again to FIG. 2, the oilfield water storage system 10 may further include additional features to assist with management thereof. For example, in embodiments, the oilfield water storage system 10 further includes a controller 34 configured to add the surface spreading agent from the surface spreading module at time intervals, which may be preset by an operator or which may be remotely set or modified. In other embodiments, the controller 34 may be configured to add the surface spreading agent or film-forming composition upon detecting a pre-determined trigger event. Additionally, in embodiments, the oilfield water storage system 10 further includes a detector 36 that is configured to provide a signal corresponding to the pre-determined trigger event. For example, in embodiments, the detector 36 is a mechanism, such as a sensor, having functionality to detect presence of (and optionally amount of) bacterial species and/or presence of chemical species such as the surface spreading agent and/or the surface protectant agent. For example, the pre-determined trigger event can be based on the signal from the detector 36 indicating that a content of biological species is present above an acceptable level. In another embodiment, the pre-determined trigger event is based on the signal from the detector 36 indicating a deficiency of the surface spreading agent. For example, the controller 34 may be in operable communication with a unit 38 that is adapted to receive the article that includes the film-forming composition. In embodiments, the unit is further adapted to distribute the film-forming composition including the surface spreading agent into the water storage pond 12 to increase an amount thereof in the water storage pond 12 as needed. Additionally, when the mechanical agitator 22 is employed, the controller may appropriately initiate or modify venting conditions for the open-air pond using the mechanical agitator 22. The mechanical agitator 22 may additionally be situated proximate to the dispersing module 38 to assist with sub-surface dispersal of the surface spreading agent or film-forming composition.

Instead of or in addition to employing the detector 36 to monitor the surface spreading layer 14, an alternative method for identifying the presence of surface spreading agent in an open-air water storage pond 12 may be employed. Over time, the surface spreading layer 14 can degrade and eventually dissipate, at which time more of the surface spreading agent is to be added to the water storage pond 12. Since environmental conditions can differ from one geographic location to the next, the rate of degradation varies. Furthermore, since the surface spreading layer 14 is by nature very thin, it may not be possible to visibly detect the presence of the surface spreading layer on the surface of the water storage pond 12. In an embodiment, to detect the presence of the surface spreading layer 14 independent of use of the detector 36, a buoyant, water soluble indicator is applied to the surface of the water storage pond 12. Provided that the surface spreading layer 14 is present on the surface of the water storage pond 12, the dissolution of the water soluble material is impeded. In this way, the surface spreading layer 14 can be detected by observing whether the water soluble material dissolves or not after application to the surface of the water storage pond 12. In embodiments, the buoyant, water soluble indicator is applied to the surface of the water storage pond 12 a period of time after application of the surface spreading agent to the water storage pond 12. For example, in an embodiment, the buoyant, water soluble indicator is applied to the surface of the water storage pond 12 at least 30 minutes after applying the film-forming composition to provide sufficient time for the surface spreading layer 14 to self-assemble and disperse across the water storage pond 12. In this regard, the buoyant, water soluble indicator may be employed to determine whether the dosage of the surface spreading agent in the water storage pond 12 is sufficient. Additional surface spreading agent can then be applied to the water storage pond 12 if deemed necessary. In other embodiments, the buoyant, water soluble indicator is applied to the surface of the water storage pond 12 at least one day after applying the film-forming composition to determine if the surface spreading layer 14 is still effectively present on the surface of the water storage pond 12. Additional surface spreading agent can then be applied to the water storage pond 12 if deemed necessary.

Materials that can be used as the water soluble indicator include, for example, powdered hydrated lime, powdered lactic acid, powdered polyvinyl alcohol, and a polyvinyl alcohol sheet. For scenarios where the water soluble indicator is in powdered form, the surface area of the powder may be selected such that the powder is buoyant and tends to the surface of the water. For scenarios where the water soluble indicator is in sheet form, the thickness of the sheet may be controlled such that the sheet is buoyant and tends to the surface of the water.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims.

What is claimed is:

1. An article comprising:
a film-forming composition comprising:
a surface spreading agent present in an amount of at least 5 weight percent, based on a total weight of the film-forming composition;
a densifying agent having a higher density than water and the surface spreading agent, wherein the densifying agent is chosen from silica sand, slag sand, pea gravel, metal powders, or a combination thereof; and
a dissolution agent chosen from calcium hydroxide, hydrated lime, or a combination thereof;
wherein the film-forming composition includes a sufficient amount of the densifying agent to render the film-forming composition denser than water; and
wherein the film-forming composition is packaged in a water-soluble impervious material.

2. The article of claim 1, wherein the impervious material provides ultraviolet protection to the film-forming composition.

3. The article of claim 1, wherein the impervious material is a polyvinyl alcohol-containing composition.

4. The article of claim 1, wherein the surface spreading agent is chosen from an aliphatic alcohol having from 12 to 24 carbon atoms; polydiorganosiloxanes; polyoxyethylene ether; or a combination, thereof.

5. An oilfield water storage system comprising:
a water storage pond having a surface;
a unit adapted to receive an article comprising a film-forming composition, wherein the film-forming composition is packaged in a water-soluble impervious material, wherein the film-forming composition comprises:
a surface spreading agent present in an amount of at least 5 weight percent, based on a total weight of the film-forming composition;
a densifying agent having a higher density than water and the surface spreading agent, wherein the densifying agent is chosen from silica sand, slag sand, pea gravel, metal powders, or a combination thereof; and
a dissolution agent chosen from calcium hydroxide, hydrated lime, or a combination thereof;

wherein the film-forming composition includes a sufficient amount of the densifying agent to render the film-forming composition denser than water;

wherein the unit is further adapted to distribute the film-forming composition into the water storage pond by introducing the article including the water-soluble impervious material into the water storage pond whereby the water-soluble impervious material subsequently dissolves to release the film-forming composition into the water storage pond; and a water outlet pipe in fluid communication with the water storage pond below the surface of the water storage pond.

6. The oilfield water storage system of claim 5, wherein the water storage pond is an open-air water storage pond.

7. The oilfield water storage system of claim 5, further comprising a mechanical agitator adapted to agitate the surface of the water storage pond.

8. The oilfield water storage system of claim 7, further comprising a barrier forming an at least semi-enclosed barrier area in the water storage pond, with the mechanical agitator positioned therein.

9. The oilfield water storage system of claim 5, further comprising a controller and a dispersing module, wherein the controller is configured to add the film-forming composition from the dispersing module upon detecting a pre-determined trigger event.

10. The oilfield water storage system of claim 9, further comprising a detector, and wherein the detector is configured to provide a signal corresponding to the pre-determined trigger event.

11. The oilfield water storage system of claim 5, further comprising a controller and a dispersing module, wherein the controller is configured to add the film-forming composition from the dispersing module at time intervals.

12. The oilfield water storage system of claim 5, further comprising a hydraulic fracturing pump adapted to receive and pressurize water from the water outlet pipe for delivery to a well head and down into a well.

13. A method of managing an oilfield water storage system, wherein the method comprises:

applying a film-forming composition from an article comprising the film-forming composition packaged in a water-soluble impervious material to a water storage pond of the oilfield water storage system, wherein the film-forming composition comprises:

a surface spreading agent present in an amount of at least 5 weight percent, based on a total weight of the film-forming composition;

a densifying agent having a higher density than water and the surface spreading agent, wherein the densifying agent is chosen from silica sand, slag sand, pea gravel, metal powders or a combination thereof; and a dissolution agent chosen from calcium hydroxide, hydrated lime, or a combination thereof;

wherein the film-forming composition includes a sufficient amount of the densifying agent to render the film-forming composition denser than water, and wherein applying the film-forming composition comprises introducing the article including the water-soluble impervious material into the water storage pond.

* * * * *